E. ZELL.
MANUFACTURE OF PURE LITHIUM COMPOUNDS.
APPLICATION FILED OCT. 19, 1904.
935,880.
Patented Oct. 5, 1909.
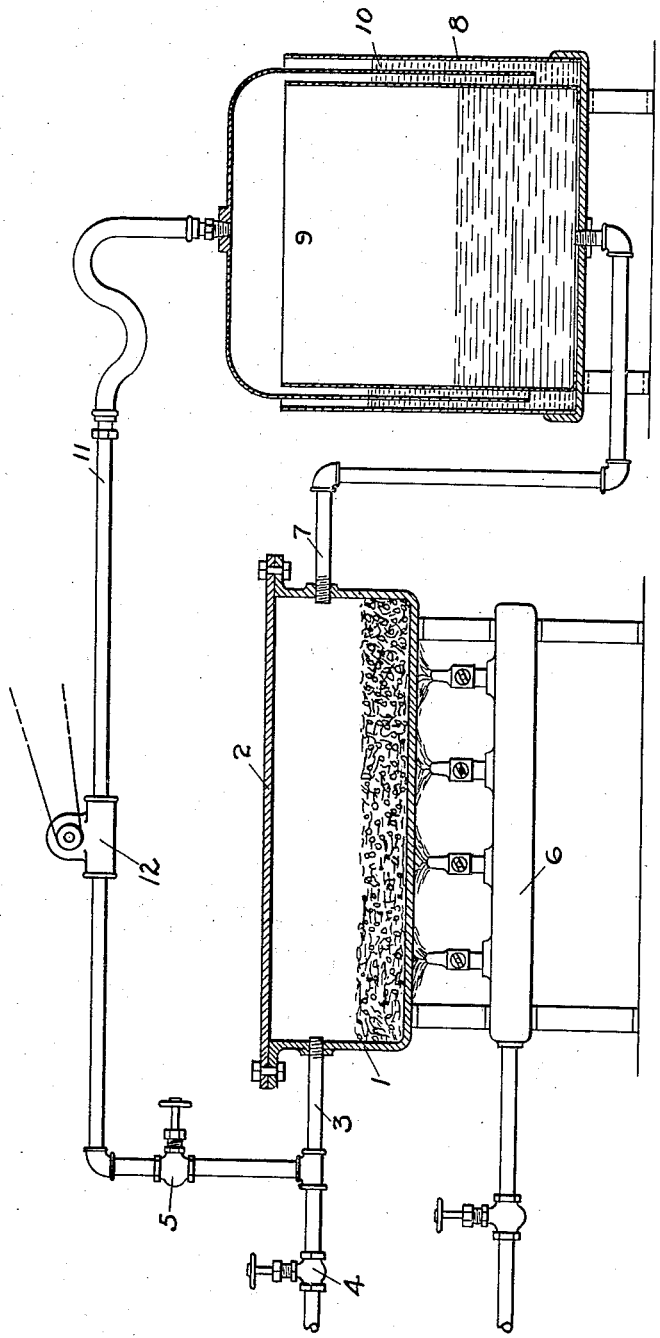
Witnesses:
Rob't Cole Chapman
Alex Orford
Inventor:
Erland Zell,
by Albert G. Davis
Atty.

UNITED STATES PATENT OFFICE.

ERLAND ZELL, OF GOTTENBORG, SWEDEN, ASSIGNOR TO GENERAL ELECTRIC COMPANY, A CORPORATION OF NEW YORK.

MANUFACTURE OF PURE LITHIUM COMPOUNDS.

935,880.   Specification of Letters Patent.   Patented Oct. 5, 1909.

Application filed October 19, 1904. Serial No. 229,076.

*To all whom it may concern:*

Be it known that I, ERLAND ZELL, a subject of the King of Sweden, residing at Gottenborg, Sweden, have invented certain new and useful Improvements in the Manufacture of Pure Lithium Compounds, of which the following is a specification.

Compounds of lithium occur widely distributed in nature, but the metal is always in such low percentages as to render its extraction expensive; furthermore the heretofore known method of extracting that metal is exceedingly complicated.

In general, it comprises the steps of grinding and mixing, dissolving in sulfuric acid, calcining, dissolving again and mixing again, boiling, precipitating, dissolving again, evaporating to dryness, digesting with alcohol, distilling off the alcohol, precipitating the solution, filtering, and final evaporation.

The process forming the subject matter of the present invention provides a means for obtaining commercial lithium compounds by an operation of a very simple nature.

It comprises the heating of minerals containing lithium or the compounds or mixtures containing lithium with carbon and the simultaneous or subsequent treatment with acetylene or other gas or hydrogen-bearing substance, thereby forming a volatile compound of lithium.

While the chemical reactions involved in the process cannot be readily ascertained, it is believed that the compound formed has the formula $LiHC_2$. This compound may be decomposed in water, yielding lithium hydroxid and acetylene, the acetylene so formed being readily available for repeating the process.

In the drawing, a closed iron retort 1 with a removable cover 2 contains a mixture of carbon and the mineral containing lithium such as lepidolite. The volatile hydrocarbon may be supplied to the retort through pipe 3, said hydrocarbon being derived from the decomposition of water by calcium carbid or in any other convenient manner, and introduced through the valve 4, or it may be derived from the decomposition of water by the products formed in the retort 1 in the manner hereinafter described, and supplied through valve 5. The retort may be heated in any convenient manner, as by the multiple gas burner 6. At a temperature easily attainable with a gas flame, say about 1000° C. the lithium ore, carbon and liberated hydrogen within the retort react to form a volatile, colorless compound, having an offensive odor and probably of the composition $LiHC_2$, which passes out through the pipe 7 and is allowed to bubble up through the water in the gas tank 8. This tank is of the usual construction provided with an expansible chamber 9 and a water seal 10. The reaction of this hydrocarbon gas on the water produces acetylene, which may be returned to the retort through pipe 11, and lithium hydroxid which remains in the gas tank 8, from which it may be removed from time to time. A small pump or blower 12, driven in any suitable manner is located in pipe 11 to insure the proper flow of acetylene from tank 9. If desired, a part of the acetylene from tank 9 may be used in the burners 6 to heat the retort 1.

While the apparatus described provides an efficient and economical method of treating the mineral the process could obviously be carried out in an apparatus differing somewhat in form. Thus, the carbon and a mineral containing lithium could be treated in an electric furnace to form lithium carbid, and the carbid then be treated at about red heat with acetylene or other hydrocarbon to form the $LiHC_2$ compound. Such a modification of the apparatus would make necessary the employment of higher temperatures to produce the reactions and would also require energy in a more expensive form than that required by the apparatus shown in the drawing. I therefore consider the simultaneous heating of the mineral and carbon in an atmosphere of volatile hydrocarbon as the more economical method of carrying out the process claimed.

What I claim as new and desire to secure by Letters Patent of the United States, is,—

1. The process of manufacturing lithium compounds consisting in heating a mineral containing lithium with carbon in the presence of a volatile hydrocarbon.

2. The process which consists in heating a reducible lithium compound with carbon in an atmosphere of acetylene to produce a lithium-hydrogen-carbid.

3. The process which consists in heating a substance capable of yielding lithium in the presence of carbon and a hydrogen yielding substance, to form a volatile compound containing lithium, hydrogen and carbon.

4. The process of manufacturing lithium compounds consisting in treating a heated lithium compound with acetylene in the presence of carbon to form a volatile lithium compound, and decomposing said volatile compound with water to form acetylene and lithium-hydroxid.

5. The process of manufacturing lithium compounds, consisting in treating a heated lithium ore with acetylene in the presence of carbon, thereby producing a volatile lithium compound containing carbon and hydrogen, decomposing said volatile compound to form acetylene and a lithium hydroxid, and utilizing the acetylene thus formed for the treatment of further quantities of mineral containing lithium.

6. The process of manufacturing lithium compounds consisting in heating a lithium ore with carbon in a closed retort, introducing acetylene into said retort, thereby forming a volatile lithium-hydrogen-carbid, decomposing said compound with water to form lithium hydroxid and acetylene, and returning said acetylene to said retort for further treatment of said ore.

7. The process which consists in heating a lithium compound in the presence of carbon and an endothermic hydro-carbon at the temperature of a gas flame to form a lithium-hydrogen-carbid, and then decomposing said carbid to form lithium hydroxid.

8. The method of forming a volatile compound containing lithium, carbon and hydrogen, which consists in reacting with a lithium ore at the temperature of a gas flame by the combined action of carbon and hydrogen.

9. The process, which consists in acting upon a lithium compound with a carbon- and hydrogen-yielding reaction mixture to form a lithium-hydrogen carbid, and then decomposing said last-named compound to form another lithium compound and a volatile hydrocarbon.

10. The process of producing a volatile lithium-hydrogen carbid which consists in passing acetylene over heated material containing carbon and a lithium compound.

11. The process which consists in producing a volatile lithium-hydrogen carbid, by passing acetylene over heated material containing carbon and lithium, and then decomposing said lithium-hydrogen carbid to produce acetylene and lithium hydroxid.

12. The process of manufacturing lithium-hydroxid, which consists in producing a volatile hydrogen carbid of lithium by acting upon a substance containing lithium with carbon and hydrogen at the temperature of a gas flame, and then decomposing said hydrogen-carbid with water to produce acetylene and lithium hydroxid.

13. The method of forming a volatile compound containing lithium, carbon and hydrogen, which consists in reacting with a lithium ore at the temperature of a gas flame by the combined action of carbon and a hydrocarbon.

In witness whereof I have hereunto set my hand this 15th day of October, 1904.

ERLAND ZELL.

Witnesses:
  HELEN ORFORD,
  G. C. HOLLISTER.